(No Model.)
J. K. VOORHEES.
CHECK ROW CORN PLANTER.
No. 348,250. Patented Aug. 31, 1886.
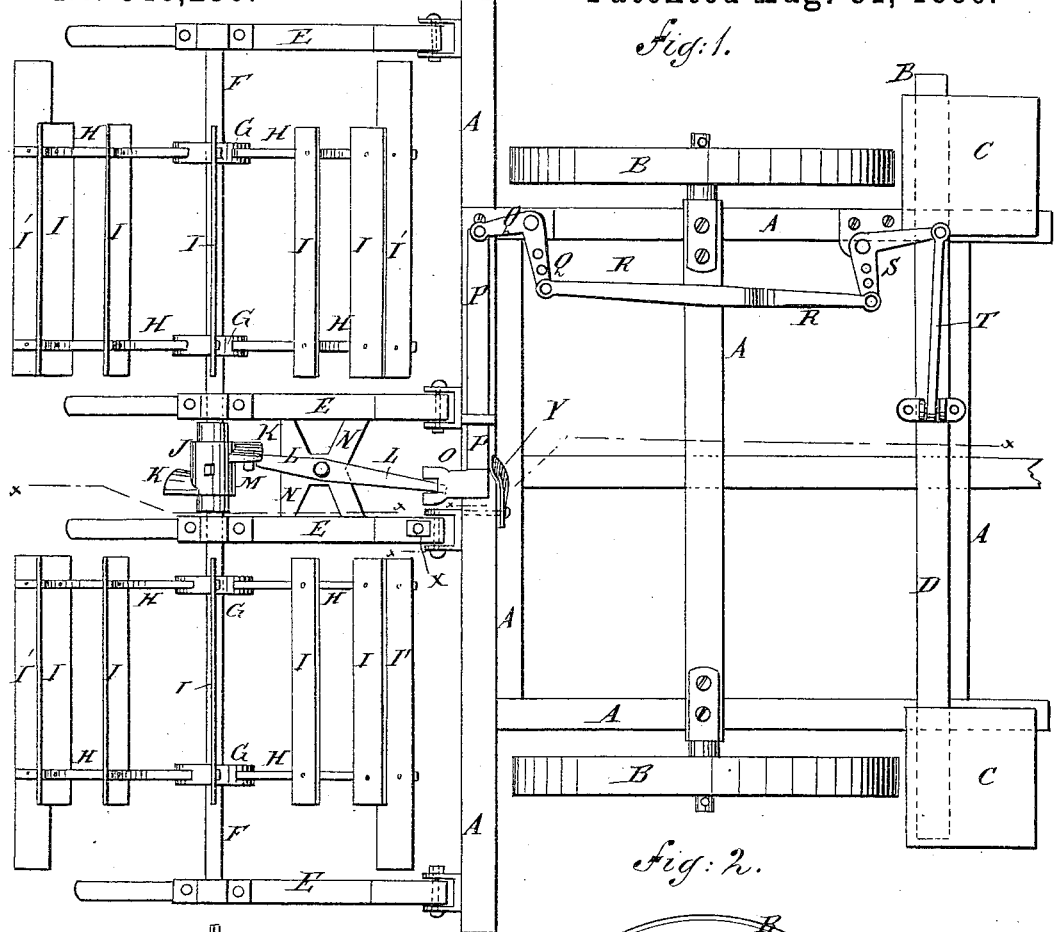
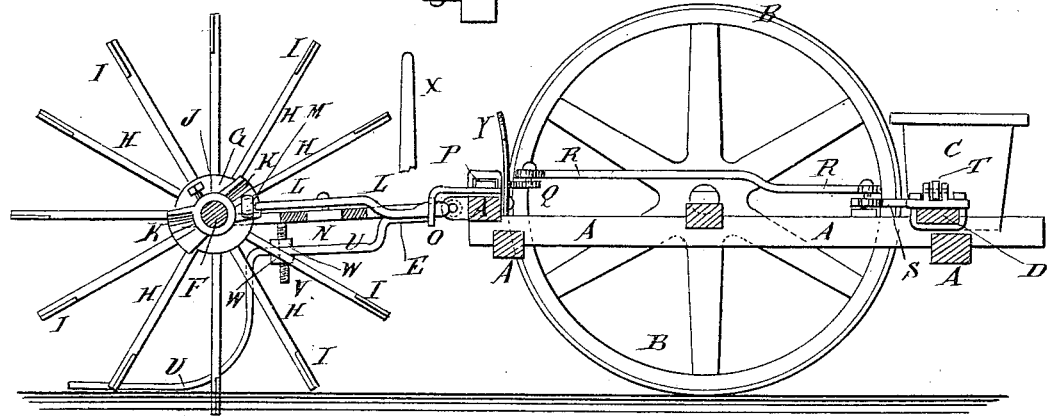
WITNESSES:
Chas. Nida
C Sedgwick
INVENTOR:
J. K. Voorhees
BY Munn & Co
ATTORNEYS.

UNITED STATES PATENT OFFICE.

JOHN K. VOORHEES, OF PELLA, IOWA.

CHECK-ROW CORN-PLANTER.

SPECIFICATION forming part of Letters Patent No. 348,250, dated August 31, 1886.

Application filed January 30, 1886. Serial No. 130,310. (No model.)

*To all whom it may concern:*

Be it known that I, JOHN K. VOORHEES, of Pella, in the county of Marion and State of Iowa, have invented a new and useful Improvement in Check-Row Corn-Planters, of which the following is a full, clear, and exact description.

Reference is to be had to the accompanying drawings, forming a part of this specification, in which similar letters of reference indicate corresponding parts in both the figures.

Figure 1 is a plan view of one of my improved check-row corn-planters. Fig. 2 is a sectional side elevation of the same, taken through the broken line $x\,x\,x\,x\,x$, Fig. 1.

The object of this invention is to provide check-row corn-planters constructed in such a manner that the corn will be planted in accurate check-row, while avoiding the annoyance caused by the use of a check-wire.

The invention consists in the construction and combination of various parts of the machine, as will be hereinafter fully described and specifically pointed out in the claims.

A represents the frame, B the wheels, C the seed-boxes, and D the seed-dropping slide, of an ordinary corn-planter.

The rear cross-bar of the frame A, or a cross-bar attached to the said frame, is extended beyond the wheels B, and to it are hinged the forward ends of two pairs of bars, E, to which, at or near their rear ends, are attached bearings, in which revolve the journals of a shaft, F. To the shaft F, between the bars E of each pair, are attached two hubs, G, provided with spokes H, and which are so arranged that the corresponding spokes of each pair of hubs will be parallel. To the corresponding spokes of each pair of hubs are attached knives I, which engage with the ground and rotate the shaft F as the machine is drawn forward. Two of the knives I' of each knife-wheel, and upon the opposite sides of the said wheels, have their outer ends extended, and are so arranged as to mark the ground in line with the cross-rows to serve as guides to the driver, so that he can keep the cross-rows in line, and thus plant the field in accurate check-row.

To the center of the shaft F is secured, by a set-screw or other suitable means, a hub, J, which is provided upon its opposite sides with spiral flanges, K, to serve as cams to operate the lever L, and which are so arranged as to move the rear end of the said lever successively in opposite directions. The friction between the cams K and the rear end of the lever L is lessened by a roller, M, pivoted to the said end of the lever. The lever L is pivoted at its middle part to a frame, N, attached to the inner bars, E, and its forward end enters a slot in the downwardly-projecting arm O, formed upon or rigidly attached to the inner end of the bar P, which slides in keepers attached to the rear cross-bar of the frame A. The outer end of the sliding bar P is pivoted to the rear arm of the elbow-lever Q, which is pivoted at its angle to the frame A, or to a support attached to said frame. To the forward arm of the elbow-lever Q is pivoted the rear end of a connecting-bar, R, the forward end of which is pivoted to the rear arm of an elbow-lever, S. The elbow-lever S is pivoted at its angle to the frame A, or to a support attached to the said frame, and to its forward arm is pivoted the end of a short connecting-bar, T, the other end of which is pivoted to a support attached to the seed-dropping-slide D, so that the said seed-dropping slide will be vibrated by the revolution of the knife-wheels G H I.

To the forward parts of the outer hinged bars, E, are secured the forward ends of bars U, which are bent downward and rearward, extend along the under side of the said bars E nearly to the shaft F, and are then curved downward and rearward to slide along the ground, and serve as gage-runners to regulate the depth to which the knives I enter the ground.

The gage-runners U, near the rear ends of their horizontal parts, are perforated to receive the screws V, the upper ends of which are rigidly attached to the bars E, and which have nuts W screwed upon them above and below the said gage-runners, so that the said gage-runners can be readily adjusted to regulate the depth to which the knives I enter the ground.

To one of the inner bars, E, is rigidly attached a lever, X, so that by operating the said lever X the bars E and shaft F and their attachments can be elevated to raise the knife-wheels G H I and the gage-runners U from the ground for convenience in turning around and passing from place to place. The lever X, when lowered to raise the knife-wheels G H I and the gage-runners U from the ground, can be locked in place by a catch-hook, Y, pivoted to the rear cross-bar of the frame A.

With this construction, by loosening the set-screw that secures the hub J, the said hub can be adjusted to bring the cams K into such a position that they will cause the seed to be dropped at the proper time to be in line with the marks made by the indicating-knives I'. With this construction, also, by changing the pivoting-pins of the connecting-rod R from one to another of the holes in the elbow-levers Q S the stroke of the check-row attachment can be adjusted to correspond with the stroke of the seed-dropping slide of the planter, to which the said attachment may be applied.

Having thus fully described my invention, I claim as new and desire to secure by Letters Patent—

1. In a corn-planter, the combined pulverizing and marking wheel comprising the hubs, the radial spokes, a series of pulverizing-knives, I, and two or more knives, I', extended at one of their ends beyond the ends of the knives to form markers, substantially as set forth.

2. A corn-planter comprising the frame A, having the wheels and the seed-dropping mechanism, of the four bars E, hinged at their forward ends to the rear of the frame, the shaft F, journaled in said bars, the circularly-arranged wheels G H I I' on the shaft between the bars, the cam-wheel J on the shaft between the two inner bars, the frame N, also between said inner bars, the lever L, pivoted on the frame, one end of the lever extending into the path of the cam-lever and the other end actuating the seed-dropping mechanism, and the runners U, adjustably secured to the outer bars, E, substantially as set forth.

3. In a corn-planter, the combination, with the outer hinged bars, E, carrying the shaft F and its attachments, of the gage-runners U and their adjusting-screws V, and nuts W, substantially as herein shown and described, whereby the depth to which the knives enter the ground can be readily regulated, as set forth.

JOHN K. VOORHEES.

Witnesses:
S. F. PROUTY,
M. A. HAIYES.